United States Patent [19]  [11] 3,876,809
Mussinan et al. [45] Apr. 8, 1975

[54] DIALKYL DIHYDROXY DITHIANES AS FLAVORING AGENTS

[75] Inventors: Cynthia J. Mussinan, Bricktown; Christopher Giacino, Califon; John P. Walradt, Fair Haven, all of N.J.

[73] Assignee: International Flavors & Fragrances Inc., New York, N.Y.

[22] Filed: June 8, 1973

[21] Appl. No.: 368,226

[52] U.S. Cl. .................................................. 426/65
[51] Int. Cl. .............................................. A23l 1/26
[58] Field of Search ............................... 426/65, 175

[56] References Cited
UNITED STATES PATENTS
2,955,041  10/1960  Broderick et al. ..................... 426/65

Primary Examiner—Joseph M. Golian
Attorney, Agent, or Firm—Brooks Haidt & Haffner

[57] ABSTRACT

The flavor of a foodstuff is altered by use of a dialkyl-dihydroxy dithiane of the formula

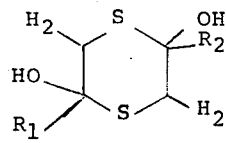

wherein each of $R_1$ and $R_2$ is an alkyl group containing from 1 to 4 carbon atoms.

10 Claims, No Drawings

DIALKYL DIHYDROXY DITHIANES AS FLAVORING AGENTS

BACKGROUND OF THE INVENTION

This invention relates to altering the organoleptic properties of foodstuffs. More particularly, the invention is concerned with the use of dialkyl-dihydroxy dithianes to alter the flavor characteristics of a foodstuff.

The term "alter" in its various forms is used herein to mean the supplying or imparting of a flavor or aroma characteristic or note to an otherwise bland, relatively tasteless or non-odorous substance, or augmenting an existing flavor or aroma characteristic where the natural flavor or intrinsic odor is deficient in some regard, or supplementing the existing flavor or aroma impression to modify its quality, character, taste or aroma.

The term "foodstuff" as used herein includes both solid and liquid ingestible materials which usually do, but need not have nutritional value. Thus, foodstuffs include meats, gravies, soups, convenience foods, beverages, dairy products, candies, vegetables, cereals, soft drinks, snacks and the like.

The reproduction of roasted meat, vegetable flavors, poultry flavors and other roasted flavors has been the subject of a long and continuing search by those engaged in the production of foodstuffs. The shortage of foods, especially protein foods, in many parts of the world has given rise to a need for utilizing non-meat sources of protein and for making such protein as palatable and meat-or poultry-like as possible. In addition, various techniques utilized in processing foods detract from their flavor quality or give rise to off-flavors. Pet and convenience or "snack" goods are increasing in volume and they require flavoring. Accordingly, materials capable of closely simulating, improving, or even exactly duplicating the flavor and aroma or roasted products, particularly meat, poultry and vegetable products have long been sought.

PRIOR ART

The 2,5-dialkyl-2,5-dihydroxy-1,4-dithianes found useful as flavoring agents in accordance with this invention are old and known compounds. For example, Bachetti and Pinaroli, *Gazz. Chim. Ital.*, 86, 1168–73 (1956); Chem. Abstracts, 52:5415b discloses the synthesis of 2,5-diethyl-2,5-dihydroxy-1,4-dithiane by the dimerization of 1-mercaptobutan-2-one prepared by reaction NaSH and 1-chloro-butan-2-one. Harberl and Grass, *Monatschefte fur Chemie*, 86, 551–568, 599–603 (1955) Chem. Abstracts, 50:10101d deals with the preparation and identification of 2,5-dimethyl-2,5-dihydroxy-1,4-dithiane. None of these references disclose any flavoring utility for these compounds. Broderic and Linteris in U.S. Pat. No. 2,955,041 state that 2,5-dihydroxy-1,4-dithiane has a meat-like flavor and can be used to impart a meat-like flavor to meatless edible compositions. This compound has only a weak flavor and is sulfury and eggy. U.S. application Ser. No. 162,008 filed July 12, 1971, has to do with the use of α-ketone alkane thiols as meat flavors and U.S. application Ser. No. 166,683 filed July 28, 1971 deals with certain trithianes as flavoring agents.

SUMMARY OF THE INVENTION AND DESCRIPTION OF PREFERRED EMBODIMENTS

In accordance with the present invention it has been found that a 2,5-dialkyl-2,5-dihydroxy-1,4-dithiane of the formula

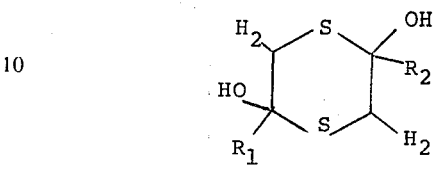

wherein each of $R_1$ and $R_2$ is the same or different and is an alkyl group containing from 1 to 4 carbon atoms, preferably methyl, ethyl or propyl, is useful to alter the flavor of foodstuffs. The dialkyl dihydroxy dithianes found especially effective are 2,5-dimethyl-2,5-dihydroxy-1,4-dithiane and 2,5-diethyl-2,5-dihydroxy-1,4-dithiane.

The dialkyl-dihydroxy dithianes are particularly preferred to impart a meaty, chickeny and livery flavor to foodstuff and are especially useful in improving the palatability of pet foods. They may be employed in meat or meatless gravies and sauces as well as vegetable and onion flavors.

The threshold value of these dialkyl dihydroxy dithianes is in the order of 2 parts per billion based on the total weight of the foodstuff. Generally, the dialkyl dihydroxy dithiane will be used in a proportion of from 0.01 to 50 parts per million based on the weight of the foodstuff.

The actual amount used will vary depending upon a variety of factors including the particular flavoring agent used, the flavor effect desired, cost considerations, the amount and type of other ingredients present, the foodstuff to be flavored and the processing and storage conditions to which the foodstuff will be subjected. It should be kept in mind that larger concentrations do not necessarily give equivalent incremental flavor enhancement. In those instances where the dialkyl-dihydroxy-dithiane is added to the foodstuff as an essential and integral part of a flavoring composition, it is necessary that the total quantity of flavoring composition employed be sufficient to yield an effective dialkyl-dihydroxy-dithiane concentration, i.e., sufficient to alter the organoleptic characteristics to which it is added or incorporated.

The dialkyl-dihydroxy-dithianes of the present invention are old compounds and may be prepared by conventional techniques such as those described in Bachetti et al., *Gazz, Chim. Ital*, 86, 1168 (1956).

The dialkyl-dihydroxy-dithianes may be employed either singly or in admixtures comprising two or more thereof. Admixtures of a dialkyl-dihydroxy dithiane with one or more other flavoring materials offer the advantages of combining the beneficial and organoleptic qualities of each of the compounds into a total impact which is superior or different from the characteristics of the sole ingredient. The formulator can simulate a wide variety of organoleptic characteristics to evoke a predetermined taste response on the part of the consumer. Among the flavoring materials found to be advantageously employed in combination with a dialkyl dihydroxy dithiane are furfural, benzaldehyde, methional, hexanal, diacetyl, 2,4-decadienal, 2,4-decadienol, the reaction product formed by heating a mixture of a polypeptide and thiamine, the reaction product formed by heating a mixture of hydrolyzed vegetable protein, cysteine and thiamine, 2-methyl furan-3-thiol, bis(2-methyl-3-furyl)-disulfide, bis(2,5-dimethyl-3-furyl)disulfide, cyclopentyl mercaptan and propyl propenyl disulfide.

Generally in use the dialkyl-dihydroxy-dithiane is admixed with one or more auxiliary flavoring adjuvants. The precise adjuvants employed will depend upon the ultimate use contemplated and the organoleptic character desired. Flavoring adjuvants are recognized in the art and are ingestibly acceptable or non-toxic. Such flavoring adjuvants include stabilizers, thickeners, surface active agents, conditioners, flavorants and flavor intensifiers.

Stabilizers include preservatives, e.g., sodium chloride, antioxidants, e.g. calcium and sodium ascorbate, ascorbic acid, butylated hydroxyanisole (mixture of 2 and 3 tertiary butyl-4-hydroxyanisole), butylated hydroxy toluene (2,6-di-tertiary-butyl-4-methyl phenol), propyl gallate and the like, sequestrants, e.g., citric acid.

Thickeners include carriers, binders, protective colloids, suspending agents, emulsifiers and the like, e.g., agar-agar; carrageenan; cellulose and cellulose derivatives such as carboxymethyl cellulose and methyl cellulose; natural and synthetic gums such as gum arabic, gum tragacanth; gelatin, proteinaceous materials; lipids; carbohydrates; starches; pectins, and emulsifiers, e.g. mono- and diglycerides of fatty acids.

Surface active agents include emulsifying agents, e.g. fatty acids such as capric acid, caprylic acid, palmitic acid, myristic acid and the like, mono- and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g. benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g sodium acetate, ammonium bicarbonate, ammonium phosphate, citric acid, lactic acid, vinegar and the like; colorants, e.g. carminic acid, cochineal, tumeric and curcunin and the like; firming agents such as aluminum sodium sulfate, calcium chloride and calcium gluconate; texturizers; anti-caking agents, e.g. aluminum calcium sulfate and tribasic calcium phosphate; enzymes; yeast foods; nutrient supplements, e.g. iron salts such as ferric phosphate, ferric pyrophosphate, ferrous gluconate and the like, riboflavin, vitamins, zinc sources such as zinc chloride, zinc sulfate and the like.

Flavorants and flavor intensifiers include organic acids, e.g., fatty saturated, unsaturated and amino acids; alcohols, e.g. primary and secondary alcohols; esters, carbonyl compounds including aldehydes and ketones, lactones; cyclic organic materials including benzene derivatives; alicyclics, heterocyclics such as furans, pyridines, pyrazines and the like, sulfur-containing materials including thiazoles, thiols, sulfides, disulfides and the like; so-called flavor potentiators such as monosodium glutamate, guanylates, inosinates, natural and synthetic flavorants such as vanillin, natural gums and the like; spices, herbs, essential oils and extractives including anise, anise oil, alkanet root extract, bay leaves, capsicum extract and the like.

The specific flavoring adjuvants selected for use may be either solid or liquid, depending upon the desired physical form of the ultimate product, i.e., foodstuff, whether simulated or natural, and should, in any event, be capable of providing an environment in which the dialkyl-dihydroxy dithiane can be dispersed or admixed to provide a homogeneous medium. In addition, selection of one or more flavoring adjuvants as well as the quantities thereof will depend upon the precise organoleptic character desired in the finished product; thus, in the case of flavoring compositions, ingredient selection will vary in accordance with the foodstuff to which the flavor and aroma are to be imparted. In contradistinction, in the preparation of solid products, e.g., simulated foodstuffs, ingredients capable of providing normally solid compositions should be selected such as various cellulose derivatives.

Flavoring compositions prepared in accordance with the present invention preferably contain the dialkyl-dihydroxy-dithiane in concentrations ranging from about $2 \times 10^{-9}$ to 25% by weight, based on the total weight of said flavoring compositions, but may contain as much as 80 or 90% by weight of the dialkyl-dihydroxy-dithiane, if the flavoring composition is then applied in small amount.

All parts, proportions, percentages and ratios herein are by weight unless otherwise indicated.

It will be understood by those skilled in the art that the dialkyl-dihydroxy-dithiane can be added to the materials to be flavored or aromatized at any convenient point in the production of the consumable material by any of the conventional techniques including spray drying, blending, stirring, dissolving and the like. Thus, when they are used to alter or otherwise vary the flavor of a foodstuff, they can be added in the original mixture, emulsion, preparation, or the like, prior to any cooking or heating operation. Alternatively, they can be added at a later stage of processing if volatilization losses would be excessive during the earlier processing.

The dialkyl-dihydroxy-dithianes of this invention can be used in the form of microcapsules containing said compounds. They may be encapsulated by any convenient method for microencapsulation such as that described in British Patent No. 1,205,769 or U.S. Pat. No. 2,800,457.

The following examples are given to illustrate embodiments of the invention as it is now preferred to practice it. It will be understood that these examples are illustrative, and the invention is not to be considered as restricted thereto except as indicated in the appended claims.

EXAMPLE I

Preparation Of
2,5-Dimethyl-2,5-Dihydroxy-1,4-Dithiane

Sodium hydroxide, 104 g, was dissolved in 1040 g of distilled water and transferred to a 2000 ml, 3-neck reaction flask equipped with a condenser, a gas dispersion tube (connected to an $H_2S$ cylinder), a mechanical stirrer, and a thermometer. The temperature is lowered to $-10°$ with a dry ice-acetone bath. The thermometer is replaced by an addition funnel. As $H_2S$ is introduced into the stirred sodium hydroxide solution, 195 g of chloroacetone are added dropwise over a 1 hour period. The thermometer is inserted periodically to insure the maintenance of a −10° temperature. Stirring and H₂S addition are continued for 30 minutes. The reaction mixture changes from yellow, to orange, to dark green, and finally to light green with the separation of a white solid. The mixture is filtered, using a Buchner funnel, and the white solid is washed with ice water. The washed product is then recrystallized from distilled water. The yield of 2,5-dimethyl-2,5-dihydroxy-1,4-dithiane was 71.48 grams or 39.4%. The product is a white crystalline solid having a melting point of 53°–54°C.

The product has a sweet chicken liver and giblet odor with onion and celery backnotes. It is suitable for roasted meat, stew meats, livery and poultry flavors.

EXAMPLE II

Samples of 2,5-dimethyl-2,5-dihydroxy-1,4-dithiane were compared by a panel of flavorists with 2,5-dihydroxy-1,4-dithiane such as shown in U.S. Pat. No. 2,955,041. Both samples were evaluated at a concentration of 205 parts per million. The panel found that the compound of U.S. Pat. No. 2,955,041, namely, 2,5-dihydroxy-1,4-dithiane was weak, sulfury, and eggy. On the other hand, the compound of the present invention, namely, 2,5-dimethyl-2,5-dihydroxy-1,4-dithiane was meaty, chickeny and livery.

EXAMPLE III

The following materials are homogeneously admixed at 25°C:

| Ingredients | Parts |
| --- | --- |
| Furfural | 1.0 |
| Benzaldehyde | 0.5 |
| Methional | 1.0 |
| n-Hexanal | 3.0 |
| Diacetyl | 2.0 |
| 2,4-Decadienal | 5.0 |
| 2,5-Dimethyl-2,5-dihydroxy-1,4-dithiane | 25.0 |
| Ethanol (95% aqueous) | 63.0 |

The resulting mixture has an excellent chicken aroma.

EXAMPLE IV

The composition prepared in Example III is dissolved in propylene glycol to provide an 0.1% solution. This solution in the amount of 0.966 g is added to 7.3 g of a soup base consisting of:

| Ingredients | Parts |
| --- | --- |
| Fine ground sodium chloride | 35.62 |
| Hydrolyzed vegetable protein | 27.40 |
| Monosodium glutamate | 17.81 |
| Sucrose | 10.96 |
| Chicken fat | 5.46 |
| Caramel color | 2.73 |

The resulting mixture is added to 12 ozs. of boiling water to obtain a soup having an excellent chicken flavor.

EXAMPLE V

The following are homogeneously admixed at 25°C:

| Ingredients: | Parts |
| --- | --- |
| Vegetable shortening | 622.7 |
| Salt | 321.7 |
| Glutamic acid | 5.1 |
| L-Cysteine Hydrochloride | 10.3 |
| Glycine | 5.1 |
| β-Alanine | 1.3 |
| Taurine | 20.0 |
| Mixture of di-sodium inosinate and di-sodium guanylate | 3.3 |
| 2,5-Dimethyl-2,5-dihydroxy-1,4-dithiane | 0.10 |

This mixture is heated to 300°F for 30 seconds. After cooling to 100°F, 0.12 part of diacetyl and 0.10 part of hexanal are added. The resulting mixture has an excellent chicken aroma.

EXAMPLE VI

The following materials are homogeneously mixed at 25°C:

| Ingredients | Parts |
| --- | --- |
| Vegetable shortening | 622.7 |
| Salt | 321.7 |
| Glutamic acid | 5.1 |
| L-Cysteine hydrochloride | 10.3 |
| Glycine | 5.1 |
| β-Alanine | 1.3 |
| Taurine | 20.0 |
| Mixture of di-sodium inosinate and di-sodium guanylate | 3.3 |

The mixture is heated at 300°F for 30 seconds. After cooling to 100°F, 0.12 part of diacetyl and 0.10 part of hexanal are added. After aging the resulting mixture for three hours, 0.1 part of 2,5-diethyl-2,5-dihydroxy-1,4-dithiane is added.

The resulting mixture is aged for 10 hours to provide a material having an excellent chicken aroma.

EXAMPLE VII

| Ingredients | Parts |
| --- | --- |
| Vegetable shortening | 622.7 |
| Salt | 321.7 |
| Glutamic acid | 5.1 |
| L-Cysteine hydrochloride | 10.3 |
| β-Alanine | 1.3 |
| Taurine | 20.0 |
| Mixture of di-sodium inosinate and di-sodium guanylate | 3.3 |

The mixture is heated at 300°F for 30 seconds. After cooling to 100°F, 0.12 part of diacetyl and 0.10 part of hexanal are added. After aging the resulting mixture for three hours 0.1 part of 2,5-dimethyl-2,5-dihydroxy-1,4-dithiane is added.

The resulting mixture is aged for 10 hours to provide a material having an excellent chicken aroma.

EXAMPLE VIII

| Ingredients | Parts |
| --- | --- |
| Vegetable shortening | 622.7 |
| Salt | 321.7 |
| Glutamic acid | 5.1 |
| L-Cysteine hydrochloride | 10.3 |

-Continued

| Ingredients | Parts |
| --- | --- |
| β-Alanine | 1.3 |
| Taurine | 20.0 |
| Mixture of di-sodium inosinate and di-sodium guanylate | 3.3 |
| 2,5-dimethyl-2,5-dihydroxy-1,4-dithiane | .05 |
| 2,5-diethyl-2,5-dihydroxy-1,4-dithiane | .05 |

The resulting mixture has an excellent chicken aroma.

EXAMPLE IX

The following ingredients are homogeneously mixed at 25°C:

| Ingredients | Parts |
| --- | --- |
| Vegetable shortening | 622.7 |
| Salt | 321.7 |
| Glutamic acid | 5.1 |
| L-Cysteine hydrochloride | 10.3 |
| Glycine | 5.1 |
| β-Alanine | 1.3 |
| Taurine | 20.0 |
| Mixture of di-sodium inosinate and di-sodium guanylate | 3.3 |

The mixture is heated to 300°F for 30 seconds. After cooling to 100°F, 0.12 part of diacetyl, 0.10 part of hexanal, and 0.1 part of 2,5-dihydroxy-2,5-dimethyl-1,4-dithiane are added.

The resulting mixture has an excellent chicken aroma.

EXAMPLE X

The following ingredients are homogeneously mixed at 25°C:

| Ingredients | Parts |
| --- | --- |
| Vegetable shortening | 622.7 |
| Salt | 321.7 |
| Glutamic acid | 5.1 |
| L-Cysteine hydrochloride | 10.3 |
| Glycine | 5.1 |
| β-Alanine | 1.3 |
| Taurine | 20.0 |
| Mixture of di-sodium inosinate and di-sodium guanylate | 2.0 |

The mixture is heated to 300°F for 60 seconds. After cooling to 100°F, 0.12 part of diacetyl and 0.10 part of hexanal are added. After aging the mixture for a period of 3 hours at a temperature of 65°F., 0.05 parts of 2,5-dihydroxy-2,5-dimethyl-1,4-dithiane are added. The resulting mixture is then aged for 10 hours to yield a composition having an excellent chicken aroma and flavor.

EXAMPLE XI a. Cysteine hydrochloride in the amount of 8.8 g is refluxed at 215°F under atmospheric pressure for 4 hours with a mixture of 309 g of hydrolyzed vegetable protein, 8.8 g thiamine HCl, and 674 g of water. Subsequent to the reflux, the mixture is cooled and 0.05 g 2,-5-dimethyl-2,5-dihydroxy-1,4-dithiane is added and intimately admixed with the composition. The mixture has an excellent beef flavor.

b. The beef flavor produced in Part (a) of this Example is added to:
1. a commercial dry type pet food;
2. a semi-moist type pet food; and
3. wet or canned pet food.

When so added at levels of 0.5, 1, 1.5, 2, 2.5 and 3% (by weight of foodstuff) highly palatable pet foods are obtained.

EXAMPLE XII

The composition prepared in Example V is dissolved in propylene glycol to provide a 0.1% solution. This solution in the amount of 0.966 g is added to 7.3 g of a soup base consisting of:

| Ingredients | Parts |
| --- | --- |
| Fine ground sodium chloride | 35.62 |
| Hydrolyzed vegetable protein | 27.40 |
| Monosodium glutamate | 17.81 |
| Sucrose | 10.96 |
| Chicken fat | 5.48 |
| Caramel color | 2.73 |

The resulting mixture is added to 12 oz. of boiling water to obtain a soup having an excellent chicken flavor.

The composition of Example VI (0.005 g) when added to the above soup base, wherein beef fat is substituted for chicken fat, provides a soup having good meat flavor.

EXAMPLE XIII

The composition prepared in Example X is dissolved in propylene glycol to provide a 0.1% solution. This solution in the amount of 0.966 g is added to 7.3 g of a soup base consisting of:

| Ingredients | Parts |
| --- | --- |
| Fine ground sodium chloride | 35.62 |
| Hydrolyzed vegetable protein (Maggi 4BE) | 27.40 |
| Monosodium glutamate | 17.81 |
| Sucrose | 10.96 |
| Chicken fat | 5.48 |
| Caramel color | 2.73 |

The resulting mixture is added to 12 ounces of boiling water to obtain a soup having an excellent chicken flavor.

The composition of Example VII (0.005 g) when added to the above soup base, wherein beef fat is substituted for chicken fat, also provides a soup having good meat flavor.

EXAMPLE XIV

Animal preference tests are conducted using a simple paired comparison design with nine dogs in each day's test. The animals are fed in individual cages and have free choice between bowls containing weighed portions of experimental (flavored) and control (unflavored) foods. After a period of 30 minutes, the dogs are removed and each dish of food reweighed to determine the amount of each consumed. Each bowl contains more food than the animal would consume in a single feeding. On the day before the comparisons are made, control food is placed in both bowls to allow the dogs to become familiar with the surroundings. A commercial dry type dog food (Purina Dog Chow — a mixture of cereal grains, fortified with minerals and vitamins) rehydrated with 20% water on a weight basis is used in the test. A concentration of 1 part per million of 2,5-dimethyl-2,5-dihydroxy-1,4-dithiane is used in the experimental (E) flavored bowls. No additional flavor is added to the control (C) bowls. The results shown in the following tabulations are obtained:

DAY 1

| DOG | Total Grams of C + E Flavored Food Consumed | % Food Consumed by Dog | |
|---|---|---|---|
| | | C | E |
| 1 | 100 | 0 | 100 |
| 2 | 190 | 16 | 84 |
| 3 | 300 | 25 | 75 |
| 4 | 260 | 25 | 75 |
| 5 | 190 | 26 | 74 |
| 6 | 215 | 37 | 63 |
| 7 | 790 | 52 | 48 |
| 8 | 320 | 33 | 67 |
| 9 | 510 | 32 | 68 |

DAY 2

| DOG | Total Grams of C + E Flavored Food Consumed | % Food Consumed by Dog | |
|---|---|---|---|
| | | C | E |
| 1 | 155 | 0 | 100 |
| 2 | 230 | 12 | 88 |
| 3 | 175 | 21 | 79 |
| 4 | 295 | 18 | 82 |
| 5 | 260 | 24 | 76 |
| 6 | 345 | 29 | 71 |
| 7 | 310 | 44 | 56 |
| 8 | 645 | 31 | 69 |
| 9 | 550 | 26 | 74 |

The average percent consumed of C and E flavored foods for Day 1 is 27% and 73%, respectively; and for Day 2, it is 23% and 77%, respectively. The preference is for the food flavored with 2,5-dimethyl-2,5-dihydroxy-1,4-dithiane.

EXAMPLE XV

Animal preference tests are conducted to compare the relative acceptance of food flavored with 2,5-dimethyl-2,5-dihydroxy-1,4-dithiane, a compound of this invention, with 2,5-dihydroxy-1,4-dithiane, the compound of U.S. Pat. No. 2,955,041. The tests are conducted in the same manner as that described in Example XIV, but in these tests ten dogs are used and each of the compounds are used at 1 part per million. In the following tabulation of results obtained the letter A designates 2,5-dihydroxy-1,4-dithiane and the letter B designates 2,5-dimethyl-2,5-dihydroxy-1,4-dithiane.

DAY 1

| DOG | Total Grams of A + B Flavored Food Consumed | % Food Consumed by Dog | |
|---|---|---|---|
| | | A | B |
| 1 | 145 | 66 | 34 |
| 2 | 260 | 28 | 72 |
| 3 | 305 | 32 | 68 |
| 4 | 215 | 14 | 86 |
| 5 | 470 | 38 | 62 |
| 6 | 400 | 49 | 51 |
| 7 | 385 | 41 | 59 |
| 8 | 245 | 21 | 79 |
| 9 | 575 | 36 | 64 |
| 10 | 460 | 17 | 83 |

DAY 2

| DOG | Total Grams of A + B Flavored Food Consumed | % Food Consumed by Dog | |
|---|---|---|---|
| | | A | B |
| 1 | 330 | 79 | 21 |
| 2 | 305 | 36 | 64 |
| 3 | 175 | 43 | 57 |
| 4 | 295 | 8 | 92 |
| 5 | 585 | 52 | 48 |
| 6 | 780 | 55 | 45 |
| 7 | 365 | 60 | 40 |
| 8 | 470 | 19 | 81 |
| 9 | 185 | 41 | 59 |
| 10 | 395 | 24 | 76 |

The average percent consumed of A and B flavored food for Day 1 is 34% and 66%, respectively; and for Day 2 it is 42% and 58%, respectively. A significant preference of the dogs for 2,5-dimethyl-2,5-dihydroxy-1,4-dithiane is demonstrated.

Human preference is also for the 2,5-dimethyl-2,5-dihydroxy-1,4-dithiane as it gives a more blended and pleasant overall aroma to the dog food, whereas, 2,5-dihydroxy-1,4-dithiane seems to accentuate the undesirable aroma character of the dog food.

What is claimed is:

1. A process for altering the flavor of a foodstuff which comprises adding thereto an amount of a 2,5-dialkyl-2,5-dihydroxy-1,4-dithiane represented by the formula

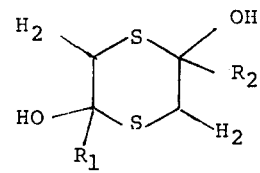

wherein $R_1$ and $R_2$ are the same or different and are lower alkyl having from 1–4 carbon atoms sufficient to impart, augment or supplement the meaty, chickeny or livery flavor of said foodstuff.

2. A process as defined in claim 1, wherein $R_1$ and $R_2$ are the same.

3. A process as defined in claim 1, wherein each of $R_1$ and $R_2$ is methyl.

4. A process as defined in claim 1, wherein each of $R_1$ and $R_2$ is ethyl.

5. A flavoring composition adapted to alter the flavor of a foodstuff comprising a flavoring adjuvant selected from the group consisting of flavorants, and flavor intensifiers and containing as an essential ingredient from about $2 \times 10^{-9}$ to 25% by weight based on the total weight of said flavoring composition of a 2,5-dialkyl-2,5-dihydroxy-1,4-dithiane of the formula

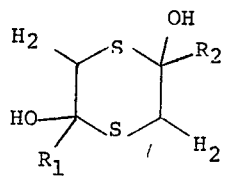

wherein $R_1$ and $R_2$ are the same or different and are lower alkyl having from 1 to 4 carbon atoms.

6. A flavoring composition as defined in claim 5 wherein $R_1$ and $R_2$ are the same.

7. A flavoring composition as defined in claim 5 wherein each of $R_1$ and $R_2$ is methyl.

8. A flavoring composition as defined in claim 5 wherein each of $R_1$ and $R_2$ is ethyl.

9. A pet food comprising an edible foodstuff and containing a dithiane of the formula

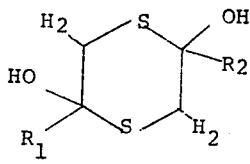

wherein $R_1$ and $R_2$ are the same or different and are lower alkyl having from 1 to 4 carbon atoms, said dithiane being present in an amount sufficient to impart, augment or supplement the meaty, chickeny or livery flavor of said foodstuff.

10. A pet food as defined in claim 9, wherein each of $R_1$ and $R_2$ is methyl.

* * * * *